UNITED STATES PATENT OFFICE.

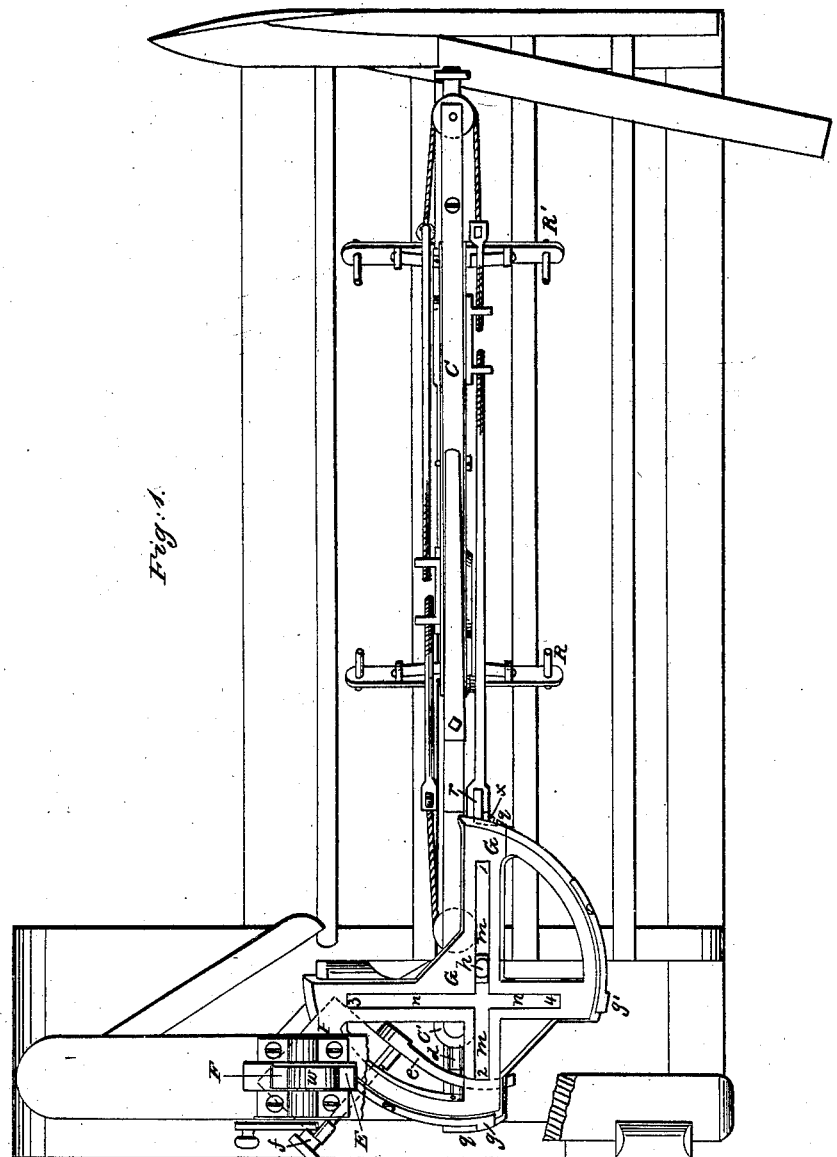

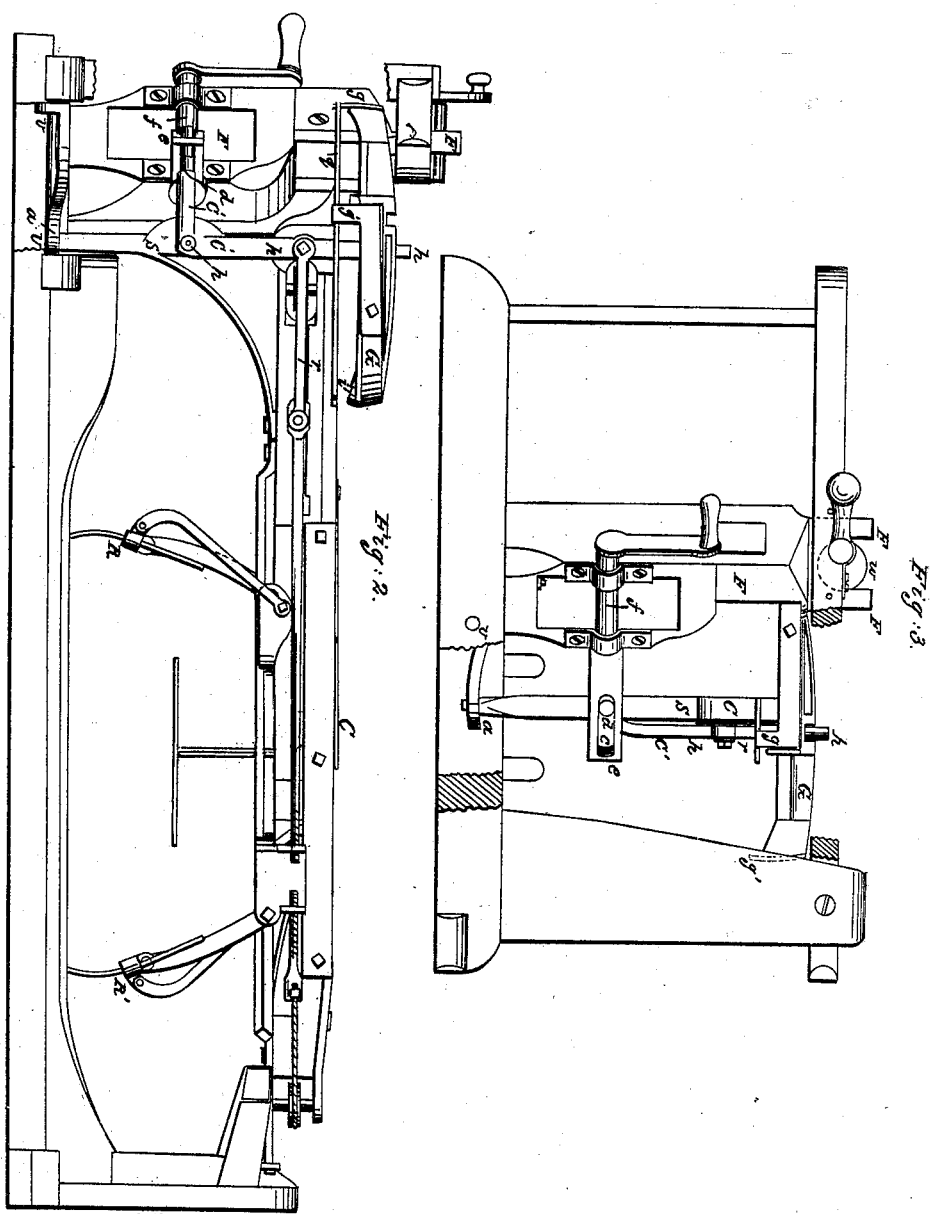

J. A. BARRINGTON, OF FREDERICKTOWN, OHIO.

IMPROVEMENT IN HARVESTERS.

Specification forming part of Letters Patent No. 22,341, dated December 21, 1858.

*To all whom it may concern:*

Be it known that I, J. A. BARRINGTON, of Fredericktown, in the county of Knox and State of Ohio, have invented a new and useful Improvement in Harvesters; and I do hereby declare that the following is a full, clear, and exact description of the same, reference being had to the annexed drawings, forming part of this specification, in the several figures of which similar characters of reference denote the same part.

Figure 1 is a top view of the platform and raking mechanism. Fig. 2 is a rear elevation of the same. Fig. 3 is a side elevation of the same.

The invention here considered refers to the manner of collecting the cut grain and delivering it in gavels in rear of the machine.

The nature of the invention consists in a peculiar combination of devices by which the raking attachment described in my patent of June 8, 1858, is operated, the construction and operation being as follows:

The rakes R R' operate to grasp and deliver the gavel, as described in the patent above referred to, and will not therefore require a minute description here.

The crane C is permanently secured to the upright shaft S, stepped at $a$, and held at top by the slotted guide-piece G, so as to be swung through ninety degrees by the turning of the said shaft.

Upon the shaft S, and connected therewith by pin $b$, is a bell-crank, C', whose short arm $d$ passes into the slot $c$ of the arm $e$ of shaft $f$. The long arm $h$ passes upward through the guide-piece G. The guide-piece G contains two slots, $m$ and $n$, at right angles to each other, as shown in Fig. 1, and has grooves in its under surface concentric with the curved edges, as shown at $i$ in Fig. 2, for the passage of arm $h$ from one slot to the other.

The arm $h$ is connected by a rod, $r$, Fig. 2, with the slide-pieces, to which the rakes R R' are attached, so as by the movement of said arm to operate the rakes, as described in the patent before mentioned.

Upon the curved edges of the guide-piece G, and at the extremities of the slots $m$ $n$, are spring-detents $g$ $g'$, made to engage notches in the ends of a projecting plate, $q$, of the crane when it is at the two extremities of its travel, as shown in Fig. 2.

The shaft $f$, step $a$, and guide-piece G are all attached to a vibrating frame, F, movable about bearings $v$ in the lower timbers of the frame by the action of the eccentric $w$. This is for the purpose of throwing the raking attachment out of gear, as the shaft $f$ is driven by a bevel-wheel upon it meshing with a bevel-wheel on the main shaft. It, moreover, furnishes a mode of lifting the rake clear of obstructions when it extends rearward.

In operation the action of arm $e$ of shaft $f$ upon arm $d$ of the bell-crank is effective in producing the partial rotation of the shaft when the extremity of arm $d$ is at its highest and lowest points, the amplitude of this vibration being ninety degrees.

During the movement of the bell-crank C' between the points where pressure on the short arm turns the shaft S the long arm thereof gives the requisite movement to the slides, which, by traversing the crane, open and close the rakes R R', the said long arm moving from 1 to 2 of slot $m$ to close the rakes upon each other and grasp the gavel. At the end of this operation the extremity of said arm $h$ strikes detent $g$ and leaves the crank-shaft $f$ free to turn the crane to the rear ninety degrees. The end of arm $h$ passing by groove $i$ to end 3 of slot $n$, then passing through the length of this slot, it produces the separation of the rakes and the deposit of the gavel. At the end of this movement arm $h$ lifts detent $g'$ from notch $x$ and leaves the crane free to swing over the platform, the extremity of arm $h$ passing to end 1 of slot $m$, at which this description commenced.

The detents $g$ and $g'$ catch in notches $x$ at the opposite extremities of a projecting piece, $q$, of the crane, slotted for the movement of arm $h$, as above described, the outer extremity of this piece engaging detent $g$ and the inner portion the detent $g'$, as shown and described.

What I claim, and desire to secure by Letters Patent, is—

1. The combination of the bell-crank C' and guide-piece G with the crane C, rod $r$, connecting the crank-arm $h$ with the rakes, and the crank-shaft $f$, giving motion to the system, the operation being substantially as described.

2. Connecting the entire raking mechanism with the vibrating frame F, substantially as and for the purposes set forth.

In testimony whereof I have hereunto signed my name before two subscribing witnesses.

J. A. BARRINGTON.

Witnesses:
 A. GREENLEE,
 G. W. SARGENT.